US006618017B1

(12) United States Patent
Ryken et al.

(10) Patent No.: US 6,618,017 B1
(45) Date of Patent: Sep. 9, 2003

(54) GPS CONFORMAL ANTENNA HAVING A PARASITIC ELEMENT

(75) Inventors: Marvin L. Ryken, Oxnard, CA (US); Albert F. Davis, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/147,715

(22) Filed: May 20, 2002

(51) Int. Cl.[7] ................................................. H01Q 1/28
(52) U.S. Cl. ................. 343/705; 343/708; 343/700 MS
(58) Field of Search ................................. 343/705, 708, 343/700 MS, 833, 834; H01Q 1/28

(56) References Cited

U.S. PATENT DOCUMENTS 3,573,831 A * 4/1971 Forbes ...................... 343/705
4,591,865 A * 5/1986 Canal ........................ 343/767
5,008,681 A * 4/1991 Cavallaro et al. ..... 343/700 MS

* cited by examiner

Primary Examiner—Hoanganh Le
(74) Attorney, Agent, or Firm—David S. Kalmbaugh

(57) ABSTRACT

A GPS conformal adapted for use on a small diameter projectile. The antenna includes a GPS antenna array of six driven elements The antenna also has an antenna cover which includes a parasitic element aligned the six driven elements. The electric field coupling between the parasitic element and the driven elements produces an omnidirectional radiation pattern.

15 Claims, 2 Drawing Sheets

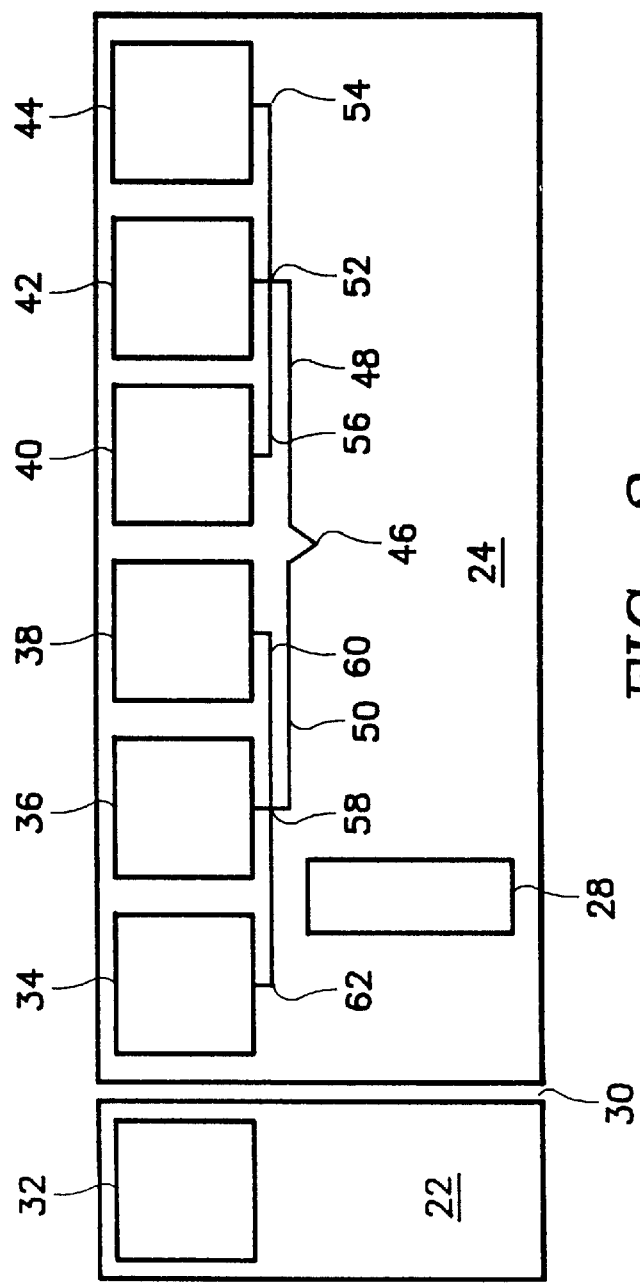
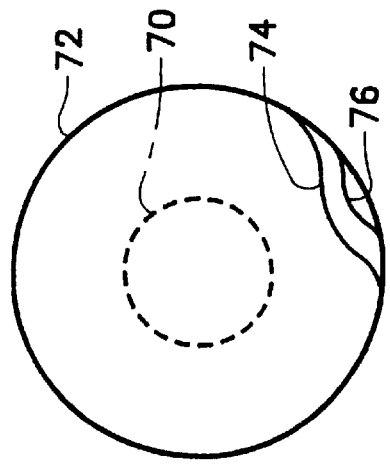
FIG. 2
FIG. 3

GPS CONFORMAL ANTENNA HAVING A PARASITIC ELEMENT

BACKGROUND OF THE INVENTION

1. Field of the Invention

The present invention relates generally to an antenna for use on a missile or the like. More specifically, the present invention relates to a microstrip antenna which includes a GPS conformal antenna which includes a parasitic element for receiving GPS data and which is adapted for use on small diameter devices such as a missile.

2. Description of the Prior Art

In the past military aircraft and weapons systems such as airplanes, target drones, pods and missiles have included flight termination and beacon tracking antenna to monitor performance during test flights. For example, a missile under test will always have an antenna which is generally surface mounted to transmit telemetry data to a ground station. The ground station then performs an analysis of the telemetry data from the missile to determine its performance during flight while tracking a target.

U.S. Pat. No. 4,356,492 is an example of a prior art microstrip antenna which is adapted for use on a missile as a wrap around band to a missile body without interfering with the aerodynamic design of the missile. U.S. Pat. No. 4,356,492 teaches a plurality of separate radiating elements which operate at widely separated frequencies from a single common input point. The common input point is fed at all the desired frequencies from a single transmission feed line.

With the emerging use of the Global Positioning System (GPS) for tracking purposes, there is a need to include GPS within the instrumentation package for a missile and target drone to accurately measure flight performance. GPS data is extremely accurate and thus allows for a thorough analysis of the missile's performance, as well as the target drone's performance in flight while the missile tracks the target drone on a course to intercept the target drone.

The use of satellite provided GPS data to monitor the position of a missile and a drone target in flight will require that an antenna for receiving the GPS data be included in the instrumentation package. The receiving antenna should preferably be mounted on the same dielectric substrate as the transmitting antenna so that the antenna assembly can be applied readily as a wrap around band to the missile body without interfering with the aerodynamic design of the missile. Similarly, the antenna assembly which would include a GPS data receiving antenna and telemetry data transmitting antenna configured as a wrap around band to the projectile's body without interfering with the aerodynamic design of the projectile.

SUMMARY OF THE INVENTION

The present invention comprises a GPS conformal antenna which is a wrap around antenna adapted for use on a small diameter projectile, such as a missile. The GPS conformal antenna includes a GPS antenna array of six driven elements mounted on the dielectric substrate and fabricated from etched copper. The six driven elements are microstrip antenna patches which operate as GPS data receiving elements receiving GPS (Global Positioning System) data from an external source such as a satellite.

The GPS conformal antenna also has an antenna cover which includes a parasitic element. The parasitic element which is passive is positioned between two of the six driven elements in alignment with the each of the six driven elements. The electric field coupling between the parasitic element and the driven elements adjacent the parasitic element produces an omnidirectional radiation pattern.

BRIEF DESCRIPTION OF THE DRAWINGS

FIG. 2 is a plan view of the GPS conformal antenna illustrated in FIG. 1; and

FIG. 3 illustrates a performance characteristic plot for the GPS conformal antenna illustrated in FIGS. 1 and 2.

DETAILED DESCRIPTION OF A PREFERRED EMBODIMENT

Figure 1:
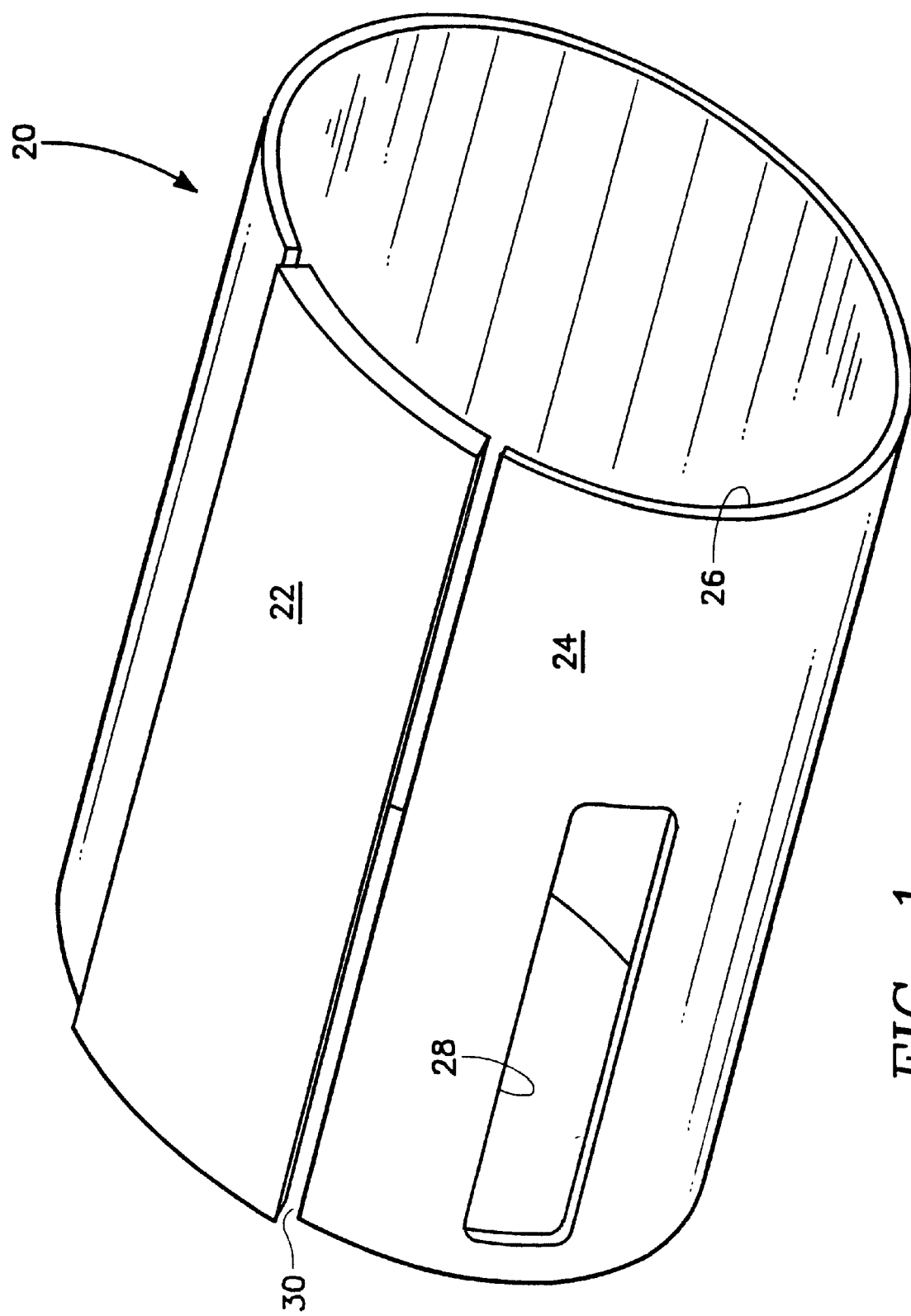
FIG. 1 is a perspective view of a GPS conformal antenna having a parasitic element comprising a preferred embodiment of the invention.

Referring to FIGS. 1 and 2, there is a shown a GPS conformal antenna, designated generally by the reference numeral 20. Antenna 20 is a wrap around antenna which is designed for use on small diameter projectiles such as missiles and target drones. The diameter of the projectile for which antenna assembly 20 is designed is approximately 2.75 inches.

The GPS conformal antenna is mounted on a dielectric substrate 24. Positioned below the dielectric substrate 24 is a ground plane. The plane is designated generally by the reference numeral 26. Dielectric substrate 24 may be fabricated from a laminate material RT/Duroid 6002 commercially available from Rogers Corporation of Rogers Connecticut. This material allows sufficient strength and physical and electrical stability to satisfy environmental requirements and is also easily mounted on the surface of a missile or a target drone. The dielectric substrate 24 may be fabricated from two layers of 0.031 inch thick material, and a 0.010 inch thick antenna protective cover board. The use of the multi-layer fabrication to fabricate the substrate is to prevent wrinkling and cracking of the substrate when the dielectric 24 is mounted on the surface of the missile.

As shown in FIG. 2, the GPS receiving antenna includes a GPS antenna array of six driven elements 34, 36, 38, 40, 42 and 44. The driven elements 34, 36, 38, 40, 42 and 44 are generally rectangular shaped approximating a square. Elements 34, 36, 38, 40, 42 and 44 are mounted on the dielectric substrate 24 and are fabricated from etched copper. Elements 34, 36, 38, 40, 42 and 44 are microstrip antenna patches which operate as GPS data receiving elements receiving GPS (Global Positioning System) data from an external source such as a satellite.

The element feed point for elements 34, 36, 38, 40, 42 and 44 is identified by the reference numeral 46 and is centrally located within the GPS antenna array of driven elements as shown in FIG. 2. The element feed point is a 50 Ohm feed point.

A main feed line 50 electrically connects element 36 to feed point 46, while a main feed line 48 electrically connects element 42 to feed point 46. The GPS receiving antenna has a first pair of branch feed lines 60 and 62 which respectively connect elements 38 and 34 to main feed line 50 at an electrical connection point 58, and a second pair of branch feed lines 54 and 56 which respectively connect elements 44 and 40 to main feed line 48 at an electrical connection point 52. Each of the feed lines 48, 50, 54, 56, 60 and 62 is fabricated from etched copper.

Referring to FIGS. 1 and 2, the GPS receiving antenna 20 also includes a parasitic element 32 which is a passive element approximating a square and is fabricated from etched copper. As depicted in FIG. 2, parasitic element 32 is neither connected to a transmission line or to any of the driven elements of the GPS microstrip antenna array. Parasitic element 32 is mounted on a tunnel cover 22, which is removable from the missile and which runs down the rail of an AMRAMM (Advanced medium range air-to air missile) platform. As is best illustrated in FIG. 2, parasitic element 32 is aligned with the driven elements around the circumference of the missile. Parasitic element 32 is E field or electric field coupled to driven elements 34, 36, 38, 40, 42 and 44 and has the function of making antenna 20 omnidirectional. Accordingly, antenna 20 operates to produce essentially the same field strength in all horizontal directions and a directive vertical radiation pattern At this time it should be noted that only six driven elements were selected for antenna 20 since the antenna is adapted to fit upon the AMRAMM missile. It should also be noted that tunnel cover 22 is removable to allow access to the internal components of the missile including the missile electronics and other devices within the missile.

The driven elements 34, 36, 38, 40, 42 and 44 are in phase (the electric field vectors add), have equal magnitudes and are time matched or time track. Time matched means that the time from the driven element 34, 36, 38, 40, 42 and 44 to the feed point 46 is identical for each of the driven elements 34, 36, 38, 40, 42 and 44.

It should be understood that the drawings are only a representation of the invention and that it is critical that each of the feed lines from the driven elements 34, 36, 38, 40, 42 and 44 to the feed point 46 be of exactly the same length to insure an omnidirectional radiation pattern is provided by antenna 20.

GPS receiving antenna 20 also has a window cutout 28 which is positioned adjacent driven elements 34 and 36. Window cutout 28 is generally rectangular shaped and functions as a mechanical interface adapted to receive a key loader which is an encryption device.

At this time it should be noted that antenna 20 operates at the L1 frequency band which is centered at 1575.42 megahertz. As shown in FIGS. 1 and 2, there is a gap 30 between the driven elements 34, 36, 38, 40, 42 and 44 and the tunnel cover 22 which includes parasitic element 32.

Referring to FIGS. 1, 2 and 3, there is depicted a performance characteristic plot 72 for a missile 70 (illustrated by dashed lines) having the GPS conformal antenna 20 wrapped around the missile's outer surface. The ideal radiation pattern for an omnidirectional antenna in the axial or circumference direction is depicted by reverence numeral 70. Without the parasitic element 22, the pattern provided by the driven elements 34, 36, 38, 40, 42 and 44 of antenna 20 would include a null 74. The electric field coupling from driven elements adjacent the parasitic element 32 in the array substantially eliminates null 74. The inclusion of parasitic element 32 in the array results in a minimal variance in the omnidirectional radiation pattern with the variance in the pattern being depicted by the reference numeral 76.

From the foregoing, it is readily apparent that the present invention comprises a new, unique, and exceedingly GPS conformal antenna for use on a small diameter projectile, such as a missile, which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A wrap around GPS (Global Positioning System) antenna for use on a missile comprising:

a ground plane mounted on an outer circumference of said missile;

a dielectric substrate mounted on said ground plane;

a GPS antenna array having a plurality of driven antenna elements mounted on said dielectric substrate around the outer circumference of said missile, said plurality of driven antenna elements spaced apart from and electrically separated from said ground plane by said dielectric substrate; and a parasitic element mounted on a tunnel cover removable from said missile, said parasitic element being disposed between a first and a second of said plurality of driven antenna elements such that an electric field coupling occurs between said parasitic element and said plurality of driven antenna elements which results in said wrap around GPS antenna providing an omnidirectional radiation pattern.

2. The wrap around GPS antenna of claim 1 wherein each of said plurality of driven antenna elements comprises a microstrip antenna element having a shape which approximates a square.

3. The wrap around GPS antenna of claim 2 wherein each of said plurality of driven antenna elements is fabricated from etched copper.

4. The wrap around GPS antenna of claim 1 wherein said parasitic element has a shape which approximates a square and is fabricated from etched copper.

5. The wrap around GPS antenna of claim 1 wherein said plurality of driven antenna elements comprises six driven antenna elements positioned around the outer circumference of said missile.

6. A wrap around GPS (Global Positioning System) antenna for use on a missile comprising:

a ground plane mounted on an outer circumference of said missile;

a dielectric substrate mounted on said ground plane;

a GPS antenna array having a plurality of driven antenna elements mounted on said dielectric substrate around the outer circumference of said missile, said plurality of driven antenna elements spaced apart from and electrically separated from said ground plane by said dielectric substrate;

an element feed point;

a plurality of feed lines, each of said plurality of feed lines having one end electrically connected to one of said plurality of driven antenna elements and the other end electrically connected to said common feed point, each of said plurality of feed lines having an identical length from element feed point to the one of said plurality of driven antenna elements connected thereto;

a parasitic element mounted on a tunnel cover removable from said missile, said parasitic element being disposed between a first and a second of said plurality of driven antenna elements such that an electric field coupling occurs between said parasitic element and said plurality of driven antenna elements which results in said wrap around GPS antenna providing an omnidirectional radiation pattern.

7. The wrap around GPS antenna of claim 6 wherein each of said plurality of driven antenna elements comprises a microstrip antenna element having a shape which approximates a square.

8. The wrap around GPS antenna of claim 7 wherein each of said plurality of driven antenna elements is fabricated from etched copper.

9. The wrap around GPS antenna of claim 6 wherein said parasitic element has a shape which approximates a square and is fabricated from etched copper.

10. The wrap around GPS antenna of claim 6 wherein each of said plurality of feed lines comprises an etched copper transmission line.

11. A wrap around GPS (Global Positioning System) antenna for use on a missile comprising:

a ground plane mounted on an outer circumference of said missile;

a dielectric substrate mounted on said ground plane;

a GPS antenna array having six driven antenna elements mounted on said dielectric substrate around the outer circumference of said missile, said six of driven antenna elements spaced apart from and electrically separated from said ground plane by said dielectric substrate;

an element feed point;

six feed lines, each of said six feed lines having one end electrically connected to one of said six driven antenna elements and the other end electrically connected to said common feed point, each of said six feed lines having an identical length from element feed point to the one of six driven antenna elements connected thereto;

a parasitic element mounted on a tunnel cover removable from said missile, said parasitic element being disposed between a first and a second of said six driven antenna elements such that an electric field coupling occurs between said parasitic element and at least two of said six driven antenna elements which results in said wrap around GPS antenna providing an omnidirectional radiation pattern.

12. The wrap around GPS antenna of claim 11 wherein each of said six driven antenna elements comprises a microstrip antenna element having a shape which approximates a square.

13. The wrap around GPS antenna of claim 11 wherein each of said six driven antenna elements is fabricated from etched copper.

14. The wrap around GPS antenna of claim 11 wherein said parasitic element has a shape which approximates a square and is fabricated from etched copper.

15. The wrap around GPS antenna of claim 11 wherein each of said plurality of feed lines comprises an etched copper transmission line.

\* \* \* \* \*